(No Model.)

E. F. PFLUEGER.
FISHING FLOAT AND LINE CONNECTION THEREFOR.

No. 351,523. Patented Oct. 26, 1886.

Witnesses:
E. W. Stuart
Dayton A. Doyle

Inventor:
Ernest F. Pflueger,
by C. P. Humphrey
Atty.

N. PETERS, Photo-Lithographer, Washington, D. C.

UNITED STATES PATENT OFFICE.

ERNEST F. PFLUEGER, OF AKRON, OHIO.

FISHING-FLOAT AND CONNECTION THEREFOR.

SPECIFICATION forming part of Letters Patent No. 351,523, dated October 26, 1886.

Application filed November 30, 1885. Serial No. 184,264. (No model.)

*To all whom it may concern:*

Be it known that I, ERNEST F. PFLUEGER, a citizen of the United States, residing at Akron, in the county of Summit and State of Ohio, have invented a new and useful Improvement in Fishing-Floats and Line-Connections Therefor, of which the following is a specification.

The object of my invention is to provide a float for fishing which shall be strong and light, and to which the line can be quickly attached and adjusted or detached.

My invention consists in the devices illustrated in the accompanying drawings, as hereinafter described and specifically claimed.

Figure 7:
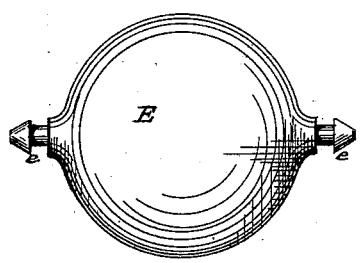
Figure 1:
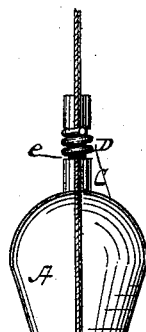
Figure 8:
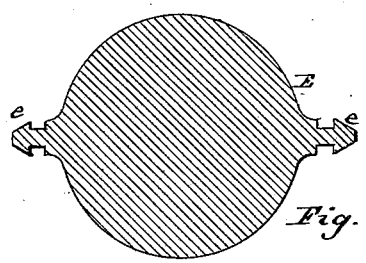
Figure 2:
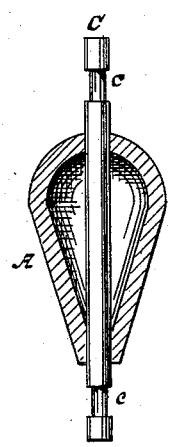
Figure 3:
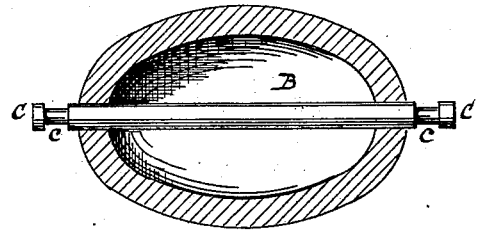
Figure 4:
Figure 6:
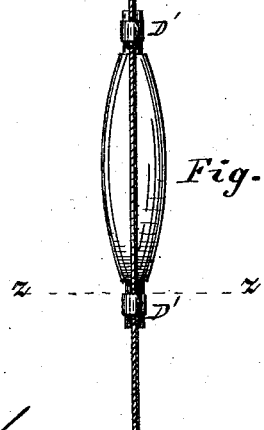
Figure 5:

In the accompanying drawings, Figure 1 is an elevation of a hollow float for fishing-lines provided with a coiled-wire fastener; Fig. 2, a vertical central section of Fig. 1, the line-fasteners being omitted; Fig. 3, a longitudinal central section of a hollow seine-float; Fig. 4, a plan of the coiled-wire fastener (slightly enlarged) at the line $x\ x$ of Fig. 1; Fig. 5, a similar view of a coiled-band fastener at the line $z\ z$ of Fig. 6; Fig. 6, a solid float for fishing-lines, showing coiled-band fasteners; and Figs. 7 and 8 are, respectively, side elevations and a central vertical section of a seine-float having stems of the same material and integral therewith.

These several floats are composed of a pulp of cloth, paper, wood, or other suitable substance, which, after being finely ground and macerated, is, by any of the ordinary means for molding pulp, pressed into desired shapes. The hollow floats A B are preferably molded in two halves and then cemented together, inclosing a central stem, C, of wood, the ends of which project beyond the body of the float. When solid floats are made, as shown in Figs. 7 and 8, E E, the projecting stems $e\ e$ may be, and preferably are, of the same material as the float, and are integral therewith. After being pressed to shape, and thoroughly dried, the floats are rendered non-absorbent by a coating of any suitable water-proof substance, and for this purpose any siccative varnish, rubber solution, or paint may be used, which, when dry, is impervious to water. In the stems which project from the float are recesses or grooves $c\ c$, in which rest the fasteners D D'. These fasteners consist either of a coiled wire, D, or a narrow band, D', of spring sheet-metal spirally wound, and of such size as will fit the grooves in the stems. The internal diameter of these fasteners is less than the neck of the stem which they inclose, and they thus retain their places on the stem by their own elasticity, and in each one end is turned outward to permit the line to be inserted, as shown in Figs. 6 and 5.

The line is connected with the float by winding it under the wire or spring, as shown in Figs. 1 and 6, and disconnected by a reverse motion.

I claim—

1. A float for fishing lines and seines, having projecting from each end a stem having an annular groove, and a coiled spring resting in said groove and encircling said stem, substantially as described.

2. The combination, with a float composed of pressed pulp coated with a water-proof substance, of a stem secured in the axis thereof, the ends of which project beyond said float and are provided with annular grooves for line-fasteners, and elastic line-holding devices resting in said annular grooves, substantially as shown, and for the purpose specified.

3. An attachment for floats for fishing lines and seines, consisting of a coiled-wire fastener resting in an annular recess in the stem of said float and retained by its own elasticity, substantially as shown.

In testimony that I claim the foregoing I have hereunto set my hand this 16th day of November, A. D. 1885.

ERNEST F. PFLUEGER.

Witnesses:
C. P. HUMPHREY,
F. C. BRYAN.